United States Patent
Liu (10) Patent No.: US 11,435,824 B2
(45) Date of Patent: Sep. 6, 2022

(54) PROMPT METHOD AND APPARATUS FOR EYE-PROTECTION MODE, ELECTRONIC DEVICE AND STORAGE MEDIUM

(71) Applicant: BAIDU ONLINE NETWORK TECHNOLOGY (BEIJING) CO., LTD., Beijing (CN)

(72) Inventor: Junqi Liu, Beijng (CN)

(73) Assignee: BAIDU ONLINE NETWORK TECHNOLOGY (BEIJING) CO., LTD, Beijing (CN)

(*) Notice: Subject to any disclaimer, the term of this patent is extended or adjusted under 35 U.S.C. 154(b) by 0 days.

(21) Appl. No.: 17/209,003

(22) Filed: Mar. 22, 2021

(65) Prior Publication Data

US 2021/0208678 A1  Jul. 8, 2021

(30) Foreign Application Priority Data

Aug. 27, 2020  (CN) .......................... 202010880201.0

(51) Int. Cl.
G06F 3/01 (2006.01)
H04W 8/18 (2009.01)
G06V 40/16 (2022.01)

(52) U.S. Cl.
CPC ............ G06F 3/013 (2013.01); G06V 40/171 (2022.01); G06V 40/172 (2022.01); H04W 8/18 (2013.01); *G06V 40/178* (2022.01)

(58) Field of Classification Search
CPC ....... G06F 3/011; G06F 3/013; G06K 9/6255; G06V 40/168; G06V 40/171; G06V 40/172; G06V 40/178; H04W 8/18
See application file for complete search history.

(56) References Cited

U.S. PATENT DOCUMENTS

2010/0054550 A1* 3/2010 Okada ................. G06V 40/175
382/118
2017/0345393 A1 11/2017 Wu et al.

FOREIGN PATENT DOCUMENTS

| CN | 103793052 A | * | 5/2014 | ............. G06F 3/01 |
| CN | 105549967 A | | 5/2016 | |
| CN | 106249878 A | * | 12/2016 | ............. G06F 3/011 |
| CN | 107463254 A | | 12/2017 | |
| CN | 107958576 A | * | 4/2018 | ............. G08B 21/24 |
| CN | 110007758 A | | 7/2019 | |

(Continued)

OTHER PUBLICATIONS

Extended European Search Report and Written Opinion for European Patent Application No. 21163940, dated May 17, 2021, 12 pages.

(Continued)

*Primary Examiner* — Mihir K Rayan
(74) *Attorney, Agent, or Firm* — Morrison & Foerster LLP (57) ABSTRACT

A prompt method for an eye-protection mode and apparatus, an electronic device and a storage medium are disclosed. The method includes: recognizing a collected face to determine an age status of a user corresponding to the face; acquiring at least two types of parameter information collected by a terminal which is in use by the user, where the at least two types of parameter information are used to represent eye-protection mode-related information; obtaining prompt information for the eye-protection mode according to the age status and the at least two types of parameter information; displaying the prompt information for the eye-protection mode.

19 Claims, 5 Drawing Sheets

(56) References Cited

FOREIGN PATENT DOCUMENTS

| CN | 110084142 | A | 8/2019 |
| CN | 111077986 | A | 4/2020 |
| JP | 2016178596 | A | 10/2016 |
| WO | WO-2018219106 | A1 | 12/2018 |

OTHER PUBLICATIONS

Office Action received for Japanese Patent Application No. 2021-091687 dated May 18, 2022, 9 pages.

\* cited by examiner

PROMPT METHOD AND APPARATUS FOR EYE-PROTECTION MODE, ELECTRONIC DEVICE AND STORAGE MEDIUM

CROSS-REFERENCE TO RELATED APPLICATIONS

This application claims priority to Chinese Patent Application No. 202010880201.0, filed on Aug. 27, 2020, which is hereby incorporated by reference in its entirety.

TECHNICAL FIELD

The present application relates to the technical field of computer vision processing. The present application particularly relates to the technical fields of artificial intelligence, deep learning and image processing, and may be applied to the technical fields of face collection, sensor data collection and other fields related to eye-protection mode.

BACKGROUND

With development of intelligence and increasing popularity of terminals, more and more users rely on too much terminals, especially mobile terminals (such as mobile phones).

SUMMARY

The present application provides a prompt method for an eye-protection mode and apparatus, an electronic device and a storage medium.

According to an aspect of the present application, a prompt method for an eye-protection mode is provided and includes:

recognizing a collected face to determine an age status of a user corresponding to the face;

acquiring at least two types of parameter information collected by a terminal which is in use by the user, wherein the at least two types of parameter information are used to represent eye-protection mode-related information;

obtaining prompt information for the eye-protection mode according to the age status and the at least two types of parameter information; and displaying the prompt information for the eye-protection mode.

According to another aspect of the present application, a prompt method for an eye-protection mode is provided and includes:

recognizing a collected face to determine an age status of a user corresponding to the face;

acquiring at least two types of parameter information collected by a terminal which is in use by the user, wherein the at least two types of parameter information are used to represent eye-protection mode-related information;

reporting the age status and the at least two types of parameter information to a server; and displaying prompt information for the eye-protection mode;

wherein the prompt information for the eye-protection mode is used to represent prompt information obtained by the server according to the age status and the at least two types of parameter information.

According to another aspect of the present application, a prompt method for an eye-protection mode is provided and includes:

receiving an age status and at least two types of parameter information reported by a terminal, wherein the age status is obtained by recognizing a face collected by the terminal, and the at least two types of parameter information are collected by the terminal which is in use by a user;

obtaining prompt information for the eye-protection mode according to the age status and the at least two types of parameter information; and sending the prompt information for the eye-protection mode to the terminal.

According to another aspect of the present application, a prompt apparatus for an eye-protection mode is provided and includes:

a first face collection module configured for recognizing a collected face to determine an age status of a user corresponding to the face;

a first information acquiring module configured for acquiring at least two types of parameter information collected by a terminal which is in use by the user, wherein the at least two types of parameter information are used to represent eye-protection mode-related information;

a first prompt information processing module configured for obtaining prompt information for the eye-protection mode according to the age status and the at least two types of parameter information; and a first display module configured for displaying the prompt information for the eye-protection mode.

According to another aspect of the present application, a prompt apparatus for an eye-protection mode is provided and includes:

a second face collection module configured for recognizing a collected face to determine an age status of a user corresponding to the face;

a second information acquiring module configured for acquiring at least two types of parameter information collected by a terminal which is in use by the user, wherein the at least two types of parameter information are used to represent eye-protection mode-related information;

a first reporting module configured for reporting the age status and the at least two types of parameter information to a server; and a second display module configured for displaying prompt information for the eye-protection mode;

wherein the prompt information for the eye-protection mode is used to represent prompt information obtained by the server according to the age status and the at least two types of parameter information.

According to another aspect of the present application, a prompt apparatus for an eye-protection mode is provided and includes:

a first receiving module configured for receiving an age status and at least two types of parameter information reported by a terminal, wherein the age status is obtained by recognizing a face collected by the terminal, and the at least two types of parameter information are collected by the terminal which is in use by a user;

a second prompt information processing module configured for obtaining prompt information for the eye-protection mode according to the age status and the at least two types of parameter information; and a first sending module configured for sending the prompt information for the eye-protection mode to the terminal.

According to another aspect of the present application, an electronic device is provided and includes:

at least one processor; and a memory communicatively connected to the at least one processor; wherein, the memory stores instructions executable by the at least one processor to enable the at least one processor to implement the method of any embodiment of the present application.

According to another aspect of the present application, a non-transitory computer-readable storage medium is provided and stores computer instructions for causing the computer to perform the method of any embodiment of the present application.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

The term "and/or" herein is only an association relationship that describes associated objects, which means that there may be three relationships, for example, A and/or B, may mean three situations including that only A exists, A and B exist at the same time, and only B exists. The term "at least one" herein means any one or any combination of at least two of the multiple, for example, including at least one of A, B, C, may mean including any one or more elements randomly selected from a set composed of A, B, and C. The terms "first" and "second" herein refer to a plurality of similar technical terms and distinguish them, and do not limit orders or limit only two, for example, a first feature and a second feature means that there are two types/two features, there may be one or more first features, and there may be one or more second features.

In addition, in order to better explain the present application, numerous specific details are given in the following specific embodiments. Those skilled in the art should understand that the present application may also be implemented without some specific details. In some examples, methods, means, elements and circuits well known to those skilled in the art have not been described in detail in order to highlight the main point of the application.

With intelligentization and rapid popularization of terminals, especially for mobile terminals, mobile internet has become the main way for users to acquire various information. Correspondingly, user groups using mobile terminals have also covered various age ranges. Since it is very convenient to acquire information, users rely on too much terminals, and each user may use multiple mobile terminals every day. As the ecosystem of various aspects of user social and life based on mobile terminals is becoming more and more complete, different services in mobile terminals (or services provided by APP) cover various aspects of users' lives, such as clothing, food, housing, transportation, entertainment, payment, acquiring information, and so on, all of which have caused users to become more and more dependent on the mobile terminals.

From the perspective of providing convenient services to users, this is a good thing. However, in fact, in life, distances between users have been widened due to the presence of the mobile terminals. The users spend more time on the mobile terminals. Especially for young children, they are more likely to indulge in the mobile terminals due to their weak self-control ability. Long-term use of mobile terminals is not good for users of all ages, especially young children who are still in the growth and development stage, which will have an impact on the growth and development of young children, such as myopia or decreased vision.

However, as described above, when a user (such as a young child) spends more time on the mobile terminal and uses the mobile terminal for a long time, it will have adverse effects on the body (such as the growth and development of young children), such as myopia. It is necessary to solve the problem of users relying too much on the mobile terminals, and to supervise duration and usage status of users using the mobile terminals, so as to at least achieve the purpose of protecting eyesight. In this regard, there is currently no effective solution.

In summary, services provided in the mobile terminals are diversified. Even in a certain APP provided by the same mobile terminal, the APP has multiple functions, for example, a video APP with video playback function may also have video comment function, and different users may choose to play videos of different types. Therefore, even for one APP, different services may be provided to a user. Further, there are cases where the same mobile terminal is used by multiple users, and these services are suitable for different user groups, and service capabilities of the same mobile terminal are a result of integration of all services. It can be concluded that services that the same mobile terminal or a certain APP of the same mobile terminal can provide to users are diversified. According to corresponding age status of different users, it is necessary to differentiate different usage duration. Especially for young children, it is necessary to provide time management capabilities for utilization of services provided by the same mobile terminal, so that younger users can also use the mobile terminal within a reasonable usage duration without supervision.

With the present application, an age status (or referred to as an age range) of a user may be determined through face recognition. Meanwhile, specific suggestions of usage duration are provided to different users, according to a state (such as lying or sitting posture) of the user using a mobile terminal, ambient light (such as whether the light is bright, soft, dazzling or dim), continuous usage duration of the terminal, usage duration of a certain service of an APP in the terminal, etc. The suggestions may be displayed on the mobile terminal in the form of prompt information for the eye-protection mode. The prompt information for the eye-protection mode may include: deactivating the mobile terminal, taking a break after 10 minutes, or that the mobile terminal will notify a guardian in a case that the mobile terminal is not deactivated after 5 minutes. Finally, when the user uses the mobile terminal, control and prompt function of usage duration is realized, thereby at least achieving the purpose of protecting eyesight of different users, especially young children.

Figure 1:
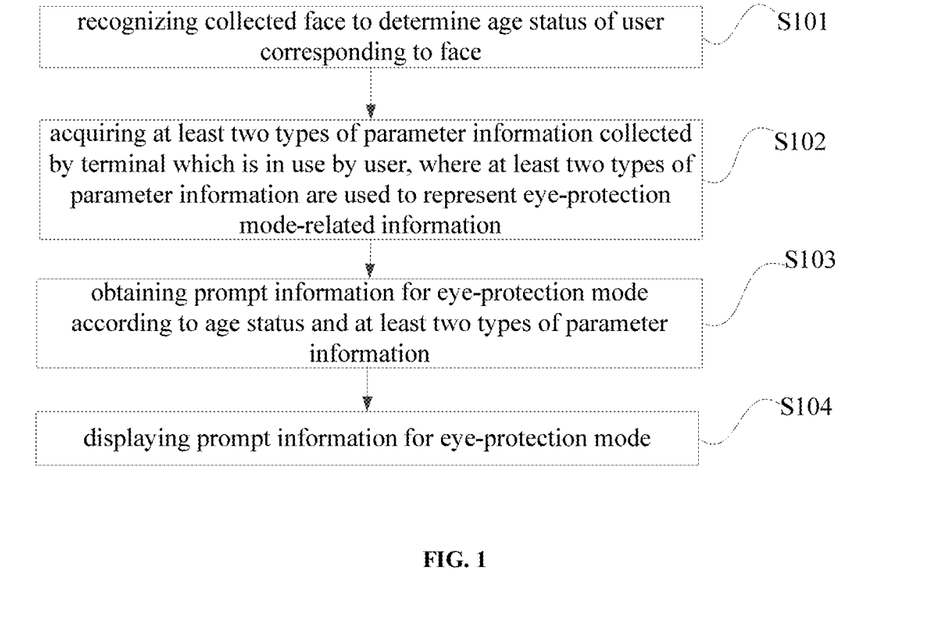
FIG. 1 is a schematic flowchart of a prompt method for an eye-protection mode according to an embodiment of the present application.

According to one embodiment of the present application, a prompt method for an eye-protection mode is provided. FIG. 1 is a schematic flowchart of a prompt method for an eye-protection mode according to an embodiment of the present application. The method may be applied to a prompt method for an eye-protection mode, for example, the device may be deployed in a terminal or server or other processing apparatus to perform face recognition, sensor data collection, data analysis to obtain prompt information for the eye-protection mode, and so on. The terminal may be a user equipment (UE), a mobile terminal, a cellular phone, a cordless phone, a personal digital assistant (PDA), a handheld device, a computing device, a vehicle-mounted device, a wearable device, etc. In some possible implementations, the method may be implemented in a manner in which a processor calls computer-readable instructions stored in a memory. As shown in FIG. 1, face recognition in the eye-protection mode, collection of at least two types of parameters and obtainment of the prompt information for the eye-protection mode are all implemented on a terminal side. A processing flow on the terminal side includes the following step.

S101: recognizing a collected face to determine an age status of a user corresponding to the face.

In one example, the collected face may be input into a pre-trained feature recognition network to extract a first face feature; the first face feature is compared with a second face feature in a face database; according to a comparison result, the age status of the user corresponding to the face is determined. Since the second face feature is used to represent user features of different age statuses, by comparing the first face feature with the second face feature in the face database, the age status of the user corresponding to the face can be determined according to the comparison result. The second face features in the face database may be stored according to an age status (or referred to as an age range) distribution of different users, or may be stored in the form of a list of age ranges. The age ranges may include: 6 years old to 12 years old; 13 years old to 18 years old; 19 years old to 25 years old; 25 years old to 35 years old; 36 years old to 45 years old; 46 years old to 55 years old; 56 years old to 70 years old, and the like. A criteria for dividing the age ranges is not limited to this example. 6 years old to 12 years old may represent an age range of young children that need critical monitoring, and may also be appropriately narrowed to 6 years old to 9 years old, etc., which may be set according to needs of users. The age range may be set in advance or a pre-set age range may be adjusted later by a guardian of young children, and these are all within the protection scope of the present application.

S102: acquiring at least two types of parameter information collected by a terminal which is in use by the user, where the at least two types of parameter information are used to represent eye-protection mode-related information.

In one example, the at least two types of parameter information include: at least two types of information among a usage status of the terminal, a brightness of current ambient light, a usage duration of the terminal, and a usage duration of a service provided by a current application loaded by the terminal. The usage status of the terminal, the brightness of current ambient light, the usage duration of the terminal, and the usage duration of the service provided by the current application loaded by the terminal all can represent the eye-protection mode-related information, and they may be considered to represent the eye-protection mode-related information from different dimensions due to their different values, and they may also be referred to as multi-dimensional reference information. The usage status of the terminal may be collected by sensors such as a gyroscope, for example, distinguish whether the user is using the terminal lying down or sitting down. The brightness of the current ambient light may be collected by an ambient light sensor, for example, distinguishing whether the ambient light is bright, soft, dazzling or dim. The usage duration of the terminal and the usage duration of the service provided by the current application loaded by the terminal may be counted according to the system time, and the corresponding usage duration may be recorded in combination with switching state of the terminal, such as startup, sleep, application startup, and exit.

S103: obtaining prompt information for the eye-protection mode according to the age status and the at least two types of parameter information.

In one example, the prompt information for the eye-protection mode may be obtained according to the parameter information including at least two of the usage status of the terminal, the brightness of current ambient light, the usage duration of the terminal, and the usage duration of the service provided by a current application loaded by the terminal, in combination with the age status.

S104: displaying the prompt information for the eye-protection mode.

In one example, the prompt information for the eye-protection mode may include: deactivating the mobile terminal, taking a break after 10 minutes, or that the mobile terminal will notify a guardian in a case that the mobile terminal is not deactivated after 5 minutes.

With this application, the collected face can be recognized to determine the age status of the user corresponding to the face. At least two types of parameter information collected by a terminal which is in use by the user can be acquired, where the at least two types of parameter information are used to represent the eye-protection mode-related information. The prompt information for the eye-protection mode can be obtained according to the age status and the at least two types of parameter information. The prompt information for the eye-protection mode can be displayed. Since the prompt information for the eye-protection mode is obtained according to the age status and at least two types of parameter information, it meets the current user's needs.

Then, different prompt information for the eye-protection mode may be customized according to age statuses (or referred to as age ranges) of different users, so as to solve the problem of users relying too much on mobile terminals for different users, and supervise the user's usage duration and usage status of mobile terminals, thereby at least achieving the purpose of protecting eyesight.

In one embodiment, the obtaining the prompt information for the eye-protection mode according to the age status and the at least two types of parameter information, may further include: obtaining a to-be-compared prompt information for the eye-protection mode, according to the parameter information including at least two of the usage status of the terminal, the brightness of current ambient light, the usage duration of the terminal and the usage duration of the service provided by the current application loaded by the terminal, in combination with the age status; acquiring preset usage duration-related data for users of different age statuses; comparing the to-be-compared prompt information for the eye-protection mode with the preset usage duration-related data; in a case that a comparison result is consistent, taking the to-be-compared prompt information for the eye-protection mode as the prompt information for the eye-protection mode, otherwise, taking the preset usage duration-related data as the prompt information for the eye-protection mode.

That is, comparing information (i.e., the to-be-compared prompt information for the eye-protection mode) obtained by real-time calculation with preset information (i.e., the preset usage duration-related data); in a case that the comparison is successful, taking the information obtained by the real-time calculation as the prompt information for the eye-protection mode. In a case that the comparison is unsuccessful, it indicates that a preset usage duration calculated by a server is more accurate, then the preset usage duration-related data is taken as the prompt information for the eye-protection mode.

In one embodiment, remote monitoring processing is triggered after the displayed prompt information for the eye-protection mode is invalid, and the prompt information for the eye-protection mode is sent to a terminal held by a guardian associated with the user. That is, in a case that the user does not respond to the prompt information for the eye-protection mode and continues to use the terminal, the remote monitoring is triggered.

In one embodiment, the collected face may be recognized regularly according to a sampling interval; and the at least two types of parameter information collected by the terminal which is in use by the user, may be acquired regularly.

Figure 2:
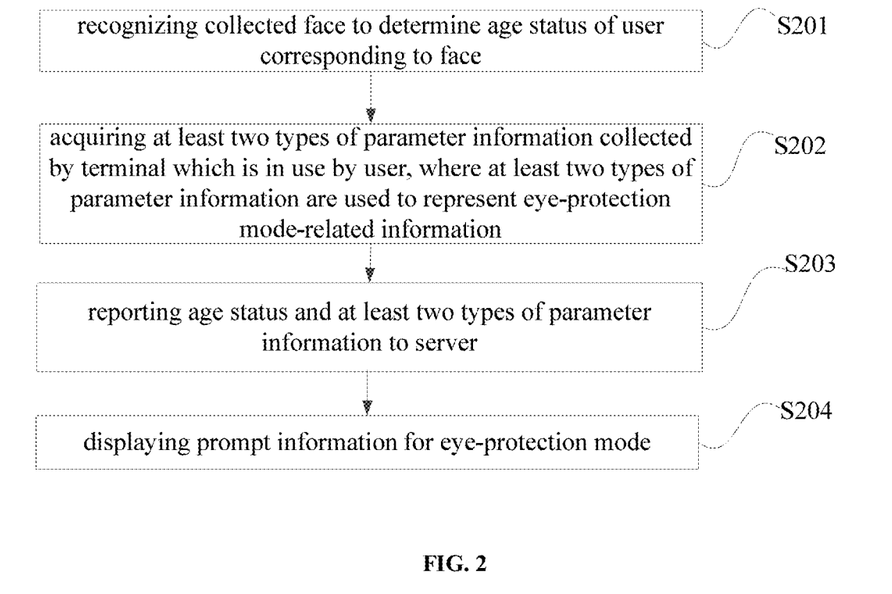
FIG. 2 is a schematic flowchart of a prompt method for an eye-protection mode according to an embodiment of the present application.

According to one embodiment of the present application, an eye-protection mode prompt method is provided. FIG. 2 is a schematic flowchart of an image quality evaluation method according to an embodiment of the present application. As shown in FIG. 2, face recognition in the eye-protection mode, collection of the at least two types pf parameter information and obtainment of the prompt information for the eye-protection mode may be realized through interaction between a terminal side and a server side. The face recognition in the eye-protection mode, and collection of the at least two types of parameter information are implemented on the terminal side. A processing flow on the terminal side includes the following step.

S201: recognizing a collected face to determine an age status of a user corresponding to the face.

In one example, the collected face may be input into a pre-trained feature recognition network to extract a first face feature; the first face feature is compared with a second face feature in a face database; according to a comparison result, the age status of the user corresponding to the face is determined. Since the second face feature is used to represent user features of different age statuses, by comparing the first face feature with the second face feature in the face database, the age status of the user corresponding to the face can be determined according to the comparison result. The second face features in the face database may be stored according to an age status (or referred to as an age range) distribution of different users, or may be stored in the form of a list of age ranges. The age ranges may include: 6 years old to 12 years old; 13 years old to 18 years old; 19 years old to 25 years old; 25 years old to 35 years old; 36 years old to 45 years old; 46 years old to 55 years old; 56 years old to 70 years old, and the like. A criteria for dividing the age ranges is not limited to this example. 6 years old to 12 years old may represent an age range of young children that need critical monitoring, and may also be appropriately narrowed to 6 years old to 9 years old, etc., which may be set according to needs of users. The age range may be set in advance or a pre-set age range may be adjusted later by a guardian of young children, and these are all within the protection scope of the present application.

S202: acquiring at least two types of parameter information collected by a terminal which is in use by the user, where the at least two types of parameter information are used to represent eye-protection mode-related information.

In one example, the at least two types of parameter information include: at least two types of information among a usage status of the terminal, a brightness of current ambient light, a usage duration of the terminal, and a usage duration of a service provided by a current application loaded by the terminal. The usage status of the terminal may be collected by sensors such as a gyroscope, for example, distinguish whether the user is using the terminal lying down or sitting down. The brightness of the current ambient light may be collected by an ambient light sensor, for example, distinguishing whether the ambient light is bright, soft, dazzling or dim. The usage duration of the terminal and the usage duration of the service provided by the current application loaded by the terminal may be counted according to the system time, and the corresponding usage duration may be recorded in combination with switching state of the terminal, such as startup, sleep, application startup, and exit.

S203: reporting the age status and the at least two types of parameter information to a server.

S204: displaying prompt information for the eye-protection mode.

In one example, the prompt information for the eye-protection mode is used to represent prompt information obtained by the server according to the age status and the at least two types of parameter information.

With this application, the terminal can recognize the collected face to determine the age status of the user corresponding to the face. At least two types of parameter information collected by the terminal which is in use by the user can be acquired, where the at least two types of parameter information are used to represent eye-protection mode-related information. The prompt information for the eye-protection mode can be obtained by the server according to the age status and the at least two types of parameter information. The prompt information for the eye-protection mode can be displayed. Since the prompt information for the eye-protection mode is obtained according to the age status and at least two types of parameter information, it meets the current user's needs. Then, different prompt information for the eye-protection mode may be customized according to age statuses (or referred to as age ranges) of different users, so as to solve the problem of users relying too much on mobile terminals for different users, and supervise the user's usage duration and usage status of mobile terminals, thereby at least achieving the purpose of protecting eyesight.

Figure 3:
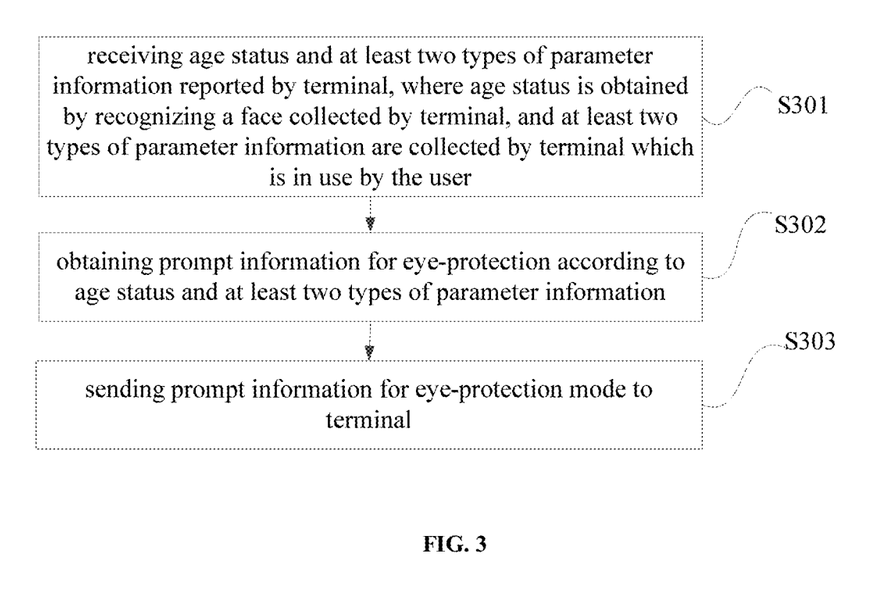
FIG. 3 is a schematic flowchart of a prompt method for an eye-protection mode according to an embodiment of the present application.

According to one embodiment of the present application, a prompt method for an eye-protection mode is provided. FIG. 3 is a schematic flowchart of an image quality evaluation method according to an embodiment of the present application. As shown in FIG. 3, face recognition in the eye-protection mode, collection of the at least two types pf parameter information and obtainment of the prompt information for the eye-protection mode may be realized through an interaction between a terminal side and a server side. The obtaining the prompt information for the eye-protection mode is implemented on the server side. A processing flow on the server side includes the following step.

S301: receiving an age status and at least two types of parameter information reported by a terminal, where the age status is obtained by recognizing a face collected by the terminal, and the at least two types of parameter information are collected by the terminal which is in use by the user.

In one example, the age status may include: 6 years old to 12 years old; 13 years old to 18 years old; 19 years old to 25 years old; 25 years old to 35 years old; 36 years old to 45 years old; 46 years old to 55 years old; 56 years old to 70 years old, and the like. A criteria for dividing the age ranges is not limited to this example. 6 years old to 12 years old may represent an age range of young children that need critical monitoring, and may also be appropriately narrowed to 6 years old to 9 years old, etc., which may be set according to needs of users. The age range may be set in advance or a pre-set age range may be adjusted later by a guardian of young children, and these are all within the protection scope of the present application.

In one example, the at least two types of parameter information include: at least two types of information among a usage status of the terminal, a brightness of current ambient light, a usage duration of the terminal, and a usage duration of a service provided by a current application loaded by the terminal. The usage status of the terminal may be collected by sensors such as a gyroscope, for example, distinguish whether the user is using the terminal lying down or sitting down. The brightness of the current ambient light may be collected by an ambient light sensor, for example, distinguishing whether the ambient light is bright, soft, dazzling or dim. The usage duration of the terminal and the usage duration of the service provided by the current application loaded by the terminal may be counted according to the system time, and the corresponding usage duration may be recorded in combination with switching state of the terminal, such as startup, sleep, application startup, and exit.

S302: obtaining prompt information for the eye-protection mode according to the age status and the at least two types of parameter information.

In one example, the prompt information for the eye-protection mode may be obtained according to the parameter information including at least two of the usage status of the terminal, the brightness of current ambient light, the usage duration of the terminal, and the usage duration of the service provided by a current application loaded by the terminal, in combination with the age status.

S303: sending the prompt information for the eye-protection mode to the terminal.

With this application, the terminal can recognize the collected face to determine the age status of the user corresponding to the face. At least two types of parameter information collected by the terminal which is in use by the user can be acquired, where the at least two types of parameter information are used to represent eye-protection mode-related information. The prompt information for the eye-protection mode can be obtained by the server according to the age status and the at least two types of parameter information. The prompt information for the eye-protection mode can be displayed. Since the prompt information for the eye-protection mode is obtained according to the age status and at least two types of parameter information, it meets the current user's needs. Then, different prompt information for the eye-protection mode may be customized according to age statuses (or referred to as age ranges) of different users, so as to solve the problem of users relying too much on mobile terminals for different users, and supervise the user's usage duration and usage status of mobile terminals, thereby at least achieving the purpose of protecting eyesight.

Application Example

Figure 4:
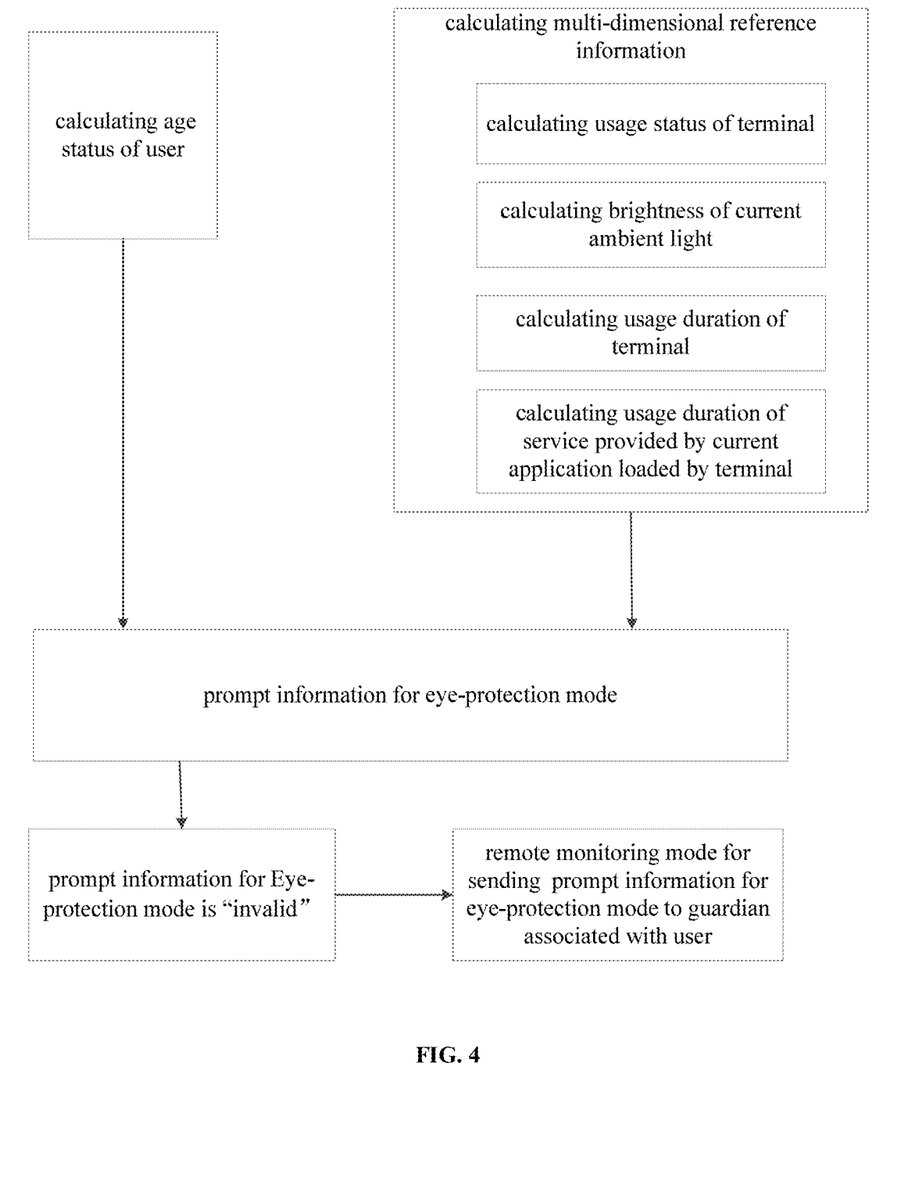
FIG. 4 is a schematic architecture diagram of a prompt method for an eye-protection mode according to an application example of an embodiment of the present application.

According to an embodiment of the present application, FIG. 4 is a schematic architecture diagram of a prompt method for an eye-protection mode according to an application example of an embodiment of the present application. As shown in FIG. 4, various modules are included, namely: a module for calculating an age status of a user, modules for calculating at least two types of parameter information (including a module for calculating a usage status of the terminal, a module for calculating a brightness of current ambient light, a module for calculating a usage duration of the terminal, and a module for calculating a usage duration of the service provided by a current application loaded by the terminal), a module for prompting an eye-protection mode, and a remote monitoring mode module for sending prompt information to a guardian corresponding to the user when the prompt information is "invalid".

Correspondingly, a processing flow applying the embodiment of the present application includes the following contents.

According to the module used for calculating an age status of a user, calculation performing on a user may include: acquiring a face photo of the user through a camera, and estimating the age status of the user through artificial intelligence related algorithms (such as feature recognition network).

According to the module used for calculating a usage status of the terminal, calculation performing on the usage status of the terminal may include: judging a status of a phone through a gyroscope, for example, whether it is always moving, or whether to lie down and play with the phone.

According to the module used for calculating a brightness of current ambient light, calculation performing on the ambient light may include: determining whether the current light is too dark or too strong through an ambient light sensor.

According to the module for calculating a usage duration of the terminal, and the module for calculating a usage duration of the service provided by a current application loaded by the terminal, calculation is performed on the usage duration of the terminal and the usage duration of the service. The usage duration of the terminal and the usage duration of the service may include continuous usage duration, discontinuous usage duration, or an overlap duration of discontinuous usage durations.

According to the module used for prompting an eye-protection mode, the eye-protection mode may be prompted. The prompt information for the eye-protection mode may be obtained by combining the age status of the user and information in the at least two types of parameter information. The prompt information may be calculated in advance, preset in the cloud (server side) and updated regularly.

According to the remote monitoring mode module for sending prompt information to a guardian corresponding to the user, remote monitoring reminder is performed. According to the user's usage, if necessary, when the prompt information is "invalid", the relevant monitoring prompt function can be triggered.

In one example, the preset usage duration-related data (such as the foregoing data which is calculated in advance, preset in the cloud and updated regularly) may be preset for users of different age ranges. The data may be issued by the cloud. Usage duration information of a certain APP in a terminal or the terminal is recorded, such as starting to open, exit, etc. When the user uses the terminal or a specific APP, relevant information (such as information in the at least two types of parameter information mentioned above, such as ambient light and other information) may be regularly sampled according to a sampling interval, such as sampling regularly every one minute.

For the foregoing preset usage duration-related data, taking the user as a young child as an example, a normal continuous usage duration of the young child may be preset in the cloud to be 30 minutes, but the young child can only watch for 25 minutes when in a lying position, the young child can only watch for 20 minutes in a dark environment, and the young child can only watch for 10 minutes in a mobile scene. Every 5 minutes of continuous rest, 15 minutes of viewing time may be restored. For example, in normal usage, the prompt information for the eye-protection mode may be displayed after 30 minutes of normal usage; but when the user uses it in a mobile state, the prompt information for the eye-protection mode may be displayed after 15 minutes of usage in the mobile state. In a case that it is used in a dark scene and lying down, the prompt information for the eye-protection mode may be displayed in a shorter time after usage, which may be calculated with a formula: normal usage*(lying down usage/normal usage)* (dark usage/normal usage)=30*(25/30)*(20/30)=16.66 minutes. When the device or APP used by the user is in an inactive state, restored usage durations may be accumulated. For example, after a 15-minute rest, 15 minutes of viewing time may be restored; while taking into account the eye protection for young children, the restored viewing time can only be up to 30 minutes.

With this example, the age status of the user can be recognized based on face recognition, and processing of sensor information may be based on corresponding data collected by various sensors. Since the prompt information for the eye-protection mode is obtained according to the age status and at least two types of parameter information, it meets the current user's needs. Then, different prompt information for the eye-protection mode may be customized according to age statuses (or referred to as age ranges) of different users, so as to solve the problem of users relying too much on mobile terminals for different users, and supervise the user's usage duration and usage status of mobile terminals, thereby at least achieving the purpose of protecting eyesight.

Figure 5:
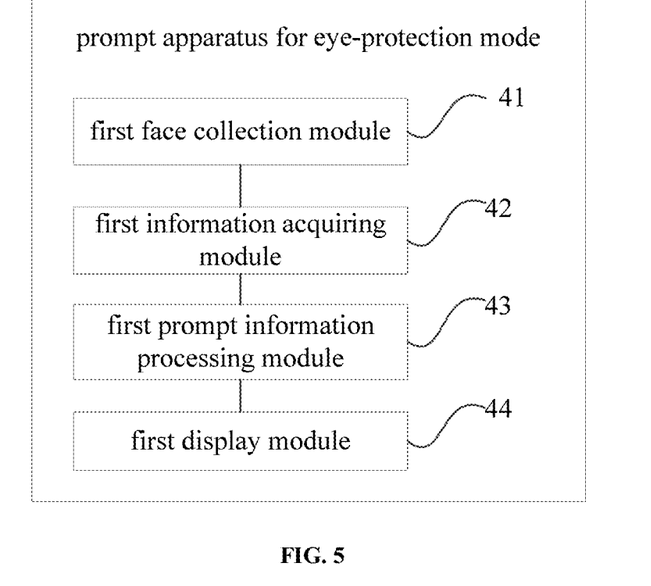
FIG. 5 is a schematic structural diagram of a prompt apparatus for an eye-protection mode according to an embodiment of the present application.

According to one embodiment of the present application, a prompt method for an eye-protection mode is provided. FIG. 5 is a schematic structural diagram of a prompt method for an eye-protection mode according to an embodiment of the present application. As shown in FIG. 5, the eye-protection mode prompt apparatus includes: a first face collection module 41 configured for recognizing a collected face to determine an age status of a user corresponding to the face; a first information acquiring module 42 configured for acquiring at least two types of parameter information collected by a terminal which is in use by the user, where the at least two types of parameter information are used to represent eye-protection mode-related information; a first prompt information processing module 43 configured for obtaining prompt information for the eye-protection mode according to the age status and the at least two types of parameter information; a first display module 44 configured for displaying the prompt information for the eye-protection mode.

In one embodiment, the first prompt information processing module is configured for obtaining the prompt information for the eye-protection mode, according to the parameter information including at least two types of a usage status of the terminal, a brightness of current ambient light, a usage duration of the terminal, and a usage duration of a service provided by a current application loaded by the terminal, in combination with the age status.

In one embodiment, the first face collection module is configured for inputting the collected face into a pre-trained feature recognition network to extract a first face feature; and comparing the first face feature with a second face feature in a face database, and determining the age status of the user corresponding to the face according to a comparison result. The second face feature is used to represent user features of different age statuses.

In one embodiment, the first prompt information processing module is configured for obtaining a to-be-compared prompt information for the eye-protection mode, according to the parameter information including at least two of the usage status of the terminal, the brightness of current ambient light, the usage duration of the terminal and the usage duration of the service provided by the current application loaded by the terminal, in combination with the age status; acquiring preset usage duration-related data for users of different age statuses; comparing the to-be-compared prompt information for the eye-protection mode with the preset usage duration-related data; in a case that a comparison result is consistent, taking the to-be-compared prompt information for the eye-protection mode as the prompt information for the eye-protection mode, otherwise, taking the preset usage duration-related data as the prompt information for the eye-protection mode.

In one embodiment, the apparatus further includes a first remote monitoring module configured for triggering remote monitoring processing after the displayed prompt information for the eye-protection mode is invalid, and sending the prompt information for the eye-protection mode to a terminal held by a guardian associated with the user.

In one embodiment, the apparatus further includes a first timing sampling module configured for recognizing regularly the collected face according to a sampling interval; and acquiring regularly the at least two types of parameter information collected by the terminal which is in use by the user.

Figure 6:
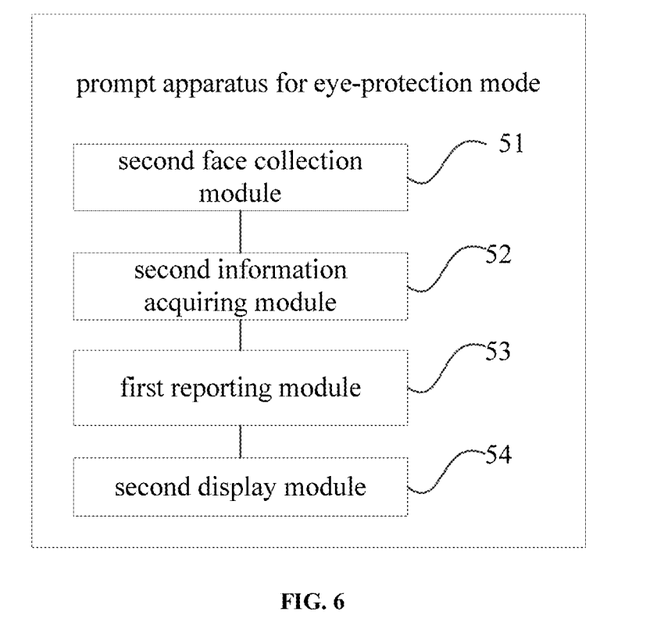
FIG. 6 is a schematic structural diagram of a prompt apparatus for an eye-protection mode according to an embodiment of the present application.

According to one embodiment of the present application, a prompt method for an eye-protection mode is provided. FIG. 6 is a schematic structural diagram of a prompt method for an eye-protection mode according to an embodiment of the present application. As shown in FIG. 6, the apparatus includes: a second face collection module 51 configured for recognizing a collected face to determine an age status of a user corresponding to the face; a second information acquiring module 52 configured for acquiring at least two types of parameter information collected by a terminal which is in use by the user, where the at least two types of parameter information are used to represent eye-protection mode-related information; a first reporting module 53 configured for reporting the age status and the at least two types of parameter information to a server; a second display module 54 configured for displaying prompt information for the eye-protection mode. The prompt information for the eye-protection mode is used to represent prompt information obtained by the server according to the age status and the at least two types of parameter information.

In one embodiment, the at least two types of parameter information include: at least two types of information among a usage status of the terminal, a brightness of current ambient light, a usage duration of the terminal, and a usage duration of a service provided by a current application loaded by the terminal.

In one embodiment, the second face collection module is configured for inputting the collected face into a pre-trained feature recognition network to extract a first face feature; and comparing the first face feature with a second face feature in a face database, and determining the age status of the user corresponding to the face according to a comparison result. The second face feature is used to represent user features of different age statuses.

Figure 7:
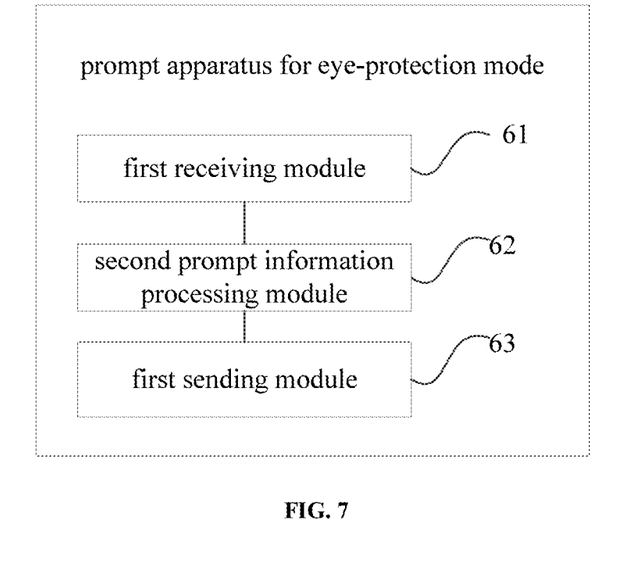
FIG. 7 is a schematic structural diagram of a prompt apparatus for an eye-protection mode according to an embodiment of the present application.

According to one embodiment of the present application, a prompt method for an eye-protection mode is provided. FIG. 7 is a schematic structural diagram of a prompt method for an eye-protection mode according to an embodiment of the present application. As shown in FIG. 7, the eye-protection mode prompt apparatus includes: a first receiving module 61 configured for receiving an age status and at least two types of parameter information reported by a terminal, where the age status is obtained by recognizing a face collected by the terminal, and the at least two types of parameter information are collected by the terminal which is in use by the user; a second prompt information processing module 62 configured for obtaining prompt information for the eye-protection mode according to the age status and the at least two types of parameter information; a first sending module 63 configured for sending the prompt information for the eye-protection mode to the terminal.

In one embodiment, the second prompt information processing module is configured for obtaining the prompt information for the eye-protection mode according to the parameter information including at least two of the usage status of the terminal, the brightness of current ambient light, the usage duration of the terminal, and the usage duration of the service provided by a current application loaded by the terminal, in combination with the age status.

Functions of various modules in the apparatus in the embodiments of the present application may refer to corresponding descriptions in the foregoing methods, which will not be repeated herein.

According to the embodiments of the present application, the present application further provides an electronic device and a readable storage medium.

Figure 8:
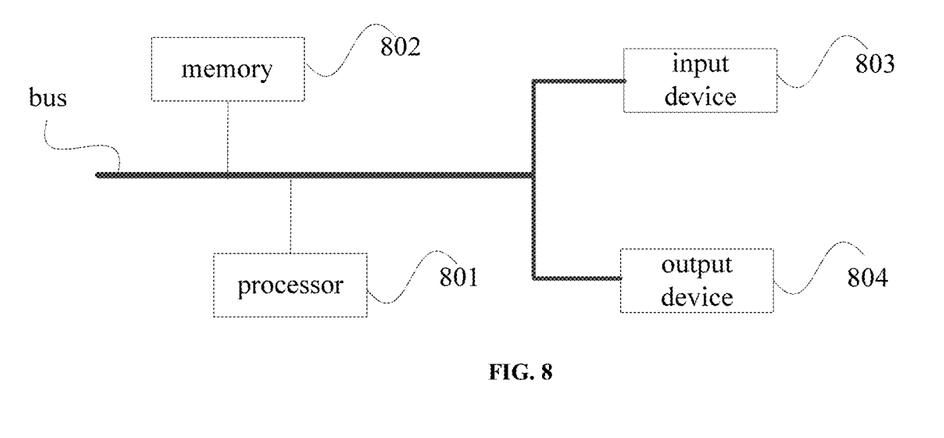
FIG. 8 is a block diagram of an electronic device for implementing a prompt method for an eye-protection mode according to an embodiment of the present application.

FIG. 8 is a block diagram of an electronic device for a prompt method for an eye-protection mode according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 8, the electronic device includes: one or more processors 801, a memory 802, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 8, one processor 801 is taken as an example.

The memory 802 is a non-transitory computer-readable storage medium provided herein. The memory stores instructions executable by at least one processor to enable the at least one processor to implement the prompt method for the eye-protection mode provided herein. The non-transitory computer-readable storage medium of the present application stores computer instructions for enabling a computer to implement the prompt method for the eye-protection mode provided herein.

The memory 802, as a non-transitory computer-readable storage medium, may be used to store non-transitory software programs, non-transitory computer-executable programs, and modules, such as program instructions/modules (e.g., the first face collection module, the first information acquiring module, the first prompt information processing module and the first display module shown in FIG. 5; the second face collection module, the second information acquiring module, the first reporting module and the second display module shown in FIG. 6; the first receiving module, the second prompt information processing module and the first sending module shown in FIG. 7) corresponding to the prompt method for the eye-protection mode of embodiments of the present application. The processor 801 executes various functional applications of the server and data processing, i.e., achieving the prompt method for the eye-protection mode in the above-mentioned method embodiment, by operating non-transitory software programs, instructions, and modules stored in the memory 802.

The memory 802 may include a program storage area and a data storage area, wherein the program storage area may store an application program required by an operating system and at least one function; the data storage area may store data created according to the use of the electronic device. In addition, the memory 802 may include a high speed random access memory, and may also include a non-transitory memory, such as at least one magnetic disk storage device, a flash memory device, or other non-transitory solid state memory device. In some embodiments, the memory 802 may optionally include memories remotely located with respect to processor 801, which may be connected via a network to the electronic device. Examples of such networks include, but are not limited to, the Internet, intranet, local area networks, mobile communication networks, and combinations thereof.

The electronic device for the prompt method for the eye-protection mode may further include: an input device 803 and an output device 804. The processor 801, the memory 802, the input device 803, and the output device 804 may be connected via a bus or otherwise. FIG. 8 takes a bus connection as an example.

The input device 803 may receive input numeric or character information and generate key signal inputs related to user settings and functional controls of the electronic device, such as input devices including touch screens, keypads, mice, track pads, touch pads, pointing sticks, one or more mouse buttons, trackballs, joysticks, etc. The output device 804 may include display devices, auxiliary lighting devices (e.g., LEDs), tactile feedback devices (e.g., vibration motors), and the like. The display device may include, but is not limited to, a Liquid Crystal Display (LCD), a Light Emitting Diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

With this application, the collected face can be recognized to determine the age status of the user corresponding to the face. At least two types of parameter information collected by a terminal which is in use by the user can be obtained, where the at least two types of parameter information are used to represent eye-protection mode-related information. The prompt information for the eye-protection mode can be obtained according to the age status and the at least two types of parameter information. The prompt information for the eye-protection mode can be displayed. Since the prompt information for the eye-protection mode is obtained according to the age status and at least two types of parameter information, it meets the current user's needs. Then, different prompt information for the eye-protection mode may be customized according to age statuses (or referred to as age ranges) of different users, so as to solve the problem of users relying too much on mobile terminals for different users, and supervise the user's usage duration and usage status of mobile terminals, thereby at least achieving the purpose of protecting eyesight.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A prompt method for an eye-protection mode, comprising:
    recognizing a collected face to determine an age status of a user corresponding to the face;
    acquiring at least two types of parameter information collected by a terminal which is in use by the user, wherein the at least two types of parameter information are used to represent eye-protection mode-related information;
    obtaining prompt information for the eye-protection mode according to the age status and the at least two types of parameter information; and
    displaying the prompt information for the eye-protection mode, wherein the method further comprises:
triggering remote monitoring processing after the displayed prompt information for the eye-protection mode is invalid; and
sending the prompt information for the eye-protection mode to a terminal held by a guardian associated with the user.

2. The method of claim 1, wherein the obtaining the prompt information for the eye-protection mode according to the age status and the at least two types of parameter information, comprises:
obtaining the prompt information for the eye-protection mode, according to the parameter information comprising at least two of a usage status of the terminal, a brightness of current ambient light, a usage duration of the terminal, and a usage duration of a service provided by a current application loaded by the terminal, in combination with the age status.

3. The method of claim 1, wherein the recognizing the collected face to determine the age status of the user corresponding to the face, comprises:
inputting the collected face into a pre-trained feature recognition network to extract a first face feature; and
comparing the first face feature with a second face feature in a face database, and determining the age status of the user corresponding to the face according to a comparison result;
wherein the second face feature is used to represent user features of different age statuses.

4. The method of claim 1, wherein the obtaining the prompt information for the eye-protection mode according to the age status and the at least two types of parameter information, comprises:
obtaining a to-be-compared prompt information for the eye-protection mode, according to the parameter information comprising at least two of a usage status of the terminal, a brightness of current ambient light, a usage duration of the terminal, and a usage duration of a service provided by a current application loaded by the terminal, in combination with the age status;
acquiring preset usage duration-related data for users of different age statuses; and
comparing the to-be-compared prompt information for the eye-protection mode with the preset usage duration-related data; in a case that a comparison result is consistent, taking the to-be-compared prompt information for the eye-protection mode as the prompt information for the eye-protection mode; and in a case that the comparison result is inconsistent, taking the preset usage duration-related data as the prompt information for the eye-protection mode.

5. The method of claim 1, further comprising:
recognizing regularly the collected face according to a sampling interval; and acquiring regularly the at least two types of parameter information collected by the terminal which is in use by the user.

6. A prompt method for an eye-protection mode, comprising:
recognizing a collected face to determine an age status of a user corresponding to the face;
acquiring at least two types of parameter information collected by a terminal which is in use by the user, wherein the at least two types of parameter information are used to represent eye-protection mode-related information;
reporting the age status and the at least two types of parameter information to a server; and
displaying prompt information for the eye-protection mode;
wherein the prompt information for the eye-protection mode is used to represent prompt information obtained by the server according to the age status and the at least two types of parameter information,
wherein remote monitoring processing is triggered after the displayed prompt information for the eye-protection mode is invalid, and the prompt information for the eye-protection mode is sent to a terminal held by a guardian associated with the user.

7. The method of claim 6, wherein the at least two types of parameter information comprise at least two of a usage status of the terminal, a brightness of current ambient light, a usage duration of the terminal, and a usage duration of a service provided by a current application loaded by the terminal.

8. The method of claim 6, wherein the recognizing the collected face to determine the age status of the user corresponding to the face, comprises:
inputting the collected face into a pre-trained feature recognition network to extract a first face feature; and
comparing the first face feature with a second face feature in a face database, and determining the age status of the user corresponding to the face according to a comparison result;
wherein the second face feature is used to represent user features of different age statuses.

9. A prompt method for an eye-protection mode, comprising:
receiving an age status and at least two types of parameter information reported by a terminal, wherein the age status is obtained by recognizing a face collected by the terminal, and the at least two types of parameter information are collected by the terminal which is in use by a user;
obtaining prompt information for the eye-protection mode according to the age status and the at least two types of parameter information; and
sending the prompt information for the eye-protection mode to the terminal.

10. The method of claim 9, wherein the obtaining the prompt information for the eye-protection mode according to the age status and the at least two types of parameter information, comprises:
obtaining the prompt information for the eye-protection mode, according to the parameter information comprising at least two of a usage status of the terminal, a brightness of current ambient light, a usage duration of the terminal, and a usage duration of a service provided by a current application loaded by the terminal, in combination with the age status.

11. A prompt apparatus for an eye-protection mode, comprising:
a processor and a memory for storing one or more computer programs executable by the processor,
wherein when executing at least one of the computer programs, the processor is configured to perform operations comprising:
recognizing a collected face to determine an age status of a user corresponding to the face;
acquiring at least two types of parameter information collected by a terminal which is in use by the user, wherein the at least two types of parameter information are used to represent eye-protection mode-related information;

obtaining prompt information for the eye-protection mode according to the age status and the at least two types of parameter information; and displaying the prompt information for the eye-protection mode, wherein when executing at least one of the computer programs, the processor is further configured to perform operations comprising:

triggering remote monitoring processing after the displayed prompt information for the eye- protection mode is invalid; and sending the prompt information for the eye-protection mode to a terminal held by a guardian associated with the user.

12. The apparatus of claim 11, wherein when executing at least one of the computer programs, the processor is further configured to perform operations comprising:

obtaining the prompt information for the eye-protection mode, according to the parameter information comprising at least two of a usage status of the terminal, a brightness of current ambient light, a usage duration of the terminal, and a usage duration of a service provided by a current application loaded by the terminal, in combination with the age status.

13. The apparatus of claim 11, wherein when executing at least one of the computer programs, the processor is further configured to perform operations comprising:

inputting the collected face into a pre-trained feature recognition network to extract a first face feature; and comparing the first face feature with a second face feature in a face database, and determining the age status of the user corresponding to the face according to a comparison result;

wherein the second face feature is used to represent user features of different age statuses.

14. A prompt apparatus for an eye-protection mode, comprising:

a processor and a memory for storing one or more computer programs executable by the processor, wherein when executing at least one of the computer programs, the processor is configured to perform operations comprising:

recognizing a collected face to determine an age status of a user corresponding to the face;

acquiring at least two types of parameter information collected by a terminal which is in use by the user, wherein the at least two types of parameter information are used to represent eye-protection mode-related information;

reporting the age status and the at least two types of parameter information to a server; and displaying prompt information for the eye-protection mode;

wherein the prompt information for the eye-protection mode is used to represent prompt information obtained by the server according to the age status and the at least two types of parameter information, wherein remote monitoring processing is triggered after the displayed prompt information for the eye-protection mode is invalid, and the prompt information for the eye-protection mode is sent to a terminal held by a guardian associated with the user.

15. A prompt apparatus for an eye-protection mode, comprising:

a processor and a memory for storing one or more computer programs executable by the processor, wherein when executing at least one of the computer programs, the processor is configured to perform operations comprising:

receiving an age status and at least two types of parameter information reported by a terminal, wherein the age status is obtained by recognizing a face collected by the terminal, and the at least two types of parameter information are collected by the terminal which is in use by a user;

obtaining prompt information for the eye-protection mode according to the age status and the at least two types of parameter information; and sending the prompt information for the eye-protection mode to the terminal, wherein remote monitoring processing is triggered after the prompt information for the eye-protection mode is invalid, and the prompt information for the eye-protection mode is sent to a terminal held by a guardian associated with the user.

16. A non-transitory computer-readable storage medium storing computer instructions for causing the computer to perform operations comprising:

recognizing a collected face to determine an age status of a user corresponding to the face;

acquiring at least two types of parameter information collected by a terminal which is in use by the user, wherein the at least two types of parameter information are used to represent eye-protection mode-related information;

obtaining prompt information for the eye-protection mode according to the age status and the at least two types of parameter information; and displaying the prompt information for the eye-protection mode, wherein the computer instructions, when executed by the computer, cause the computer to further perform operations comprising:

triggering remote monitoring processing after the displayed prompt information for the eye-protection mode is invalid; and sending the prompt information for the eye-protection mode to a terminal held by a guardian associated with the user.

17. A non-transitory computer-readable storage medium storing computer instructions for causing the computer to perform operations comprising:

recognizing a collected face to determine an age status of a user corresponding to the face;

acquiring at least two types of parameter information collected by a terminal which is in use by the user, wherein the at least two types of parameter information are used to represent eye-protection mode-related information;

reporting the age status and the at least two types of parameter information to a server; and displaying prompt information for the eye-protection mode;

wherein the prompt information for the eye-protection mode is used to represent prompt information obtained by the server according to the age status and the at least two types of parameter information, wherein remote monitoring processing is triggered after the displayed prompt information for the eye-protection mode is invalid, and the prompt information for the eye-protection mode is sent to a terminal held by a guardian associated with the user.

18. A non-transitory computer-readable storage medium storing computer instructions for causing the computer to perform operations comprising:
- receiving an age status and at least two types of parameter information reported by a terminal, wherein the age status is obtained by recognizing a face collected by the terminal, and the at least two types of parameter information are collected by the terminal which is in use by a user;
- obtaining prompt information for the eye-protection mode according to the age status and the at least two types of parameter information; and
- sending the prompt information for the eye-protection mode to the terminal,
- wherein remote monitoring processing is triggered after the prompt information for the eye-protection mode is invalid, and the prompt information for the eye-protection mode is sent to a terminal held by a guardian associated with the user.

19. The apparatus of claim 11, wherein when executing at least one of the computer programs, the processor is further configured to perform operations comprising:
- obtaining a to-be-compared prompt information for the eye-protection mode, according to the parameter information comprising at least two of a usage status of the terminal, a brightness of current ambient light, a usage duration of the terminal, and a usage duration of a service provided by a current application loaded by the terminal, in combination with the age status;
- acquiring preset usage duration-related data for users of different age statuses; and
- comparing the to-be-compared prompt information for the eye-protection mode with the preset usage duration-related data; in a case that a comparison result is consistent, taking the to-be-compared prompt information for the eye-protection mode as the prompt information for the eye-protection mode; and in a case that the comparison result is inconsistent, taking the preset usage duration-related data as the prompt information for the eye-protection mode.

* * * * *